United States Patent [19]

Mitsui

[11] 4,272,579

[45] * Jun. 9, 1981

[54] LAMINATED STACK MANUFACTURE

[75] Inventor: Yoshiaki Mitsui, Kitakyushu, Japan

[73] Assignee: Mitsui Mfg. Co., Ltd., Kitakyushu, Japan

[*] Notice: The portion of the term of this patent subsequent to Jul. 3, 1996, has been disclaimed.

[21] Appl. No.: 917,942

[22] Filed: Jun. 22, 1978

Related U.S. Application Data

[62] Division of Ser. No. 819,479, Jul. 27, 1977, Pat. No. 4,110,895.

[51] Int. Cl.³ .............................................. B32B 3/24
[52] U.S. Cl. ...................................... 428/133; 29/521; 310/216; 310/217
[58] Field of Search ..................... 29/521; 273/139; 310/217, 216; 428/64, 65, 133

[56] References Cited

U.S. PATENT DOCUMENTS

| | | | |
|---|---|---|---|
| 1,817,462 | 8/1931 | Phelps et al. | 227/105 |
| 1,861,059 | 5/1932 | Johnson | 310/211 |
| 1,874,158 | 8/1932 | Bausman et al. | 219/150 R |
| 2,283,629 | 5/1942 | Heftler | 29/433 |
| 2,368,295 | 1/1945 | Goran | 164/109 |
| 2,483,024 | 9/1949 | Roters | 29/598 |
| 2,607,816 | 8/1952 | Ryder et al. | 29/596 |
| 2,711,008 | 6/1955 | Smith | 29/596 |
| 2,763,916 | 9/1956 | Korski | 29/598 |
| 2,933,204 | 4/1960 | Ebbert | 428/65 X |
| 2,971,106 | 2/1961 | Westphalen | 310/166 |
| 2,975,312 | 3/1961 | Ploran | 310/217 |
| 2,996,791 | 8/1961 | Hicks | 29/598 |
| 2,998,638 | 9/1961 | MacLaren | 29/598 |
| 3,012,162 | 12/1961 | Rediger | 310/259 |
| 3,060,992 | 10/1962 | Hopp et al. | 72/327 |
| 3,062,262 | 11/1962 | Post | 72/329 |
| 3,070,058 | 12/1962 | Boyer | 113/121 R |
| 3,110,831 | 11/1963 | Zimmerle | 310/217 |
| 3,175,277 | 3/1965 | Brown et al. | 29/596 |
| 3,202,851 | 8/1965 | Zimmerle et al. | 310/261 X |
| 3,203,077 | 8/1965 | Zimmerle | 29/598 |
| 3,210,824 | 10/1965 | Zimmerle | 29/33 R |
| 3,590,208 | 6/1971 | Sandkrug et al. | 310/268 X |
| 3,939,686 | 2/1976 | Walters et al. | 83/529 X |
| 4,149,309 | 4/1979 | Mitsui | 428/133 X |
| 4,160,182 | 7/1979 | Mitsui | 310/217 X |

FOREIGN PATENT DOCUMENTS

| | | | |
|---|---|---|---|
| 603175 | 8/1960 | Canada | 428/133 |
| 917626 | 7/1954 | Fed. Rep. of Germany | |

Primary Examiner—Henry F. Epstein
Attorney, Agent, or Firm—Wegner, Stellman, McCord, Wiles & Wood

[57] ABSTRACT

A die structure for use in a laminated core manufacture wherein a plurality of apertured sheets are provided with projections formed from the portion of the sheet from which the apertures are formed to define an interlocked laminated stack. The first of the sheets is provided with a through aperture with the projection being eliminated so as to define a nonprojecting surface in the first of the sheets of the stack, with the projections of each of the subsequent sheets extending into and being interlocked with the preceding sheets in the aperture thereof. The punching apparatus for providing the apertures and projections is selectively operated to define either the formed aperture and projection structure or a blanked out apertured structure. The blanked out apertured structure defines the first of the sheets of the stack. The extent of the projections from the sheets is preselected to be no greater than the thickness of the sheets so that the projection of the sheets superjacent the first lamination is received fully within the blanked out aperture thereof. The blanked out sheets may be indexed to define a skewed axis dynamoelectric structure.

10 Claims, 12 Drawing Figures

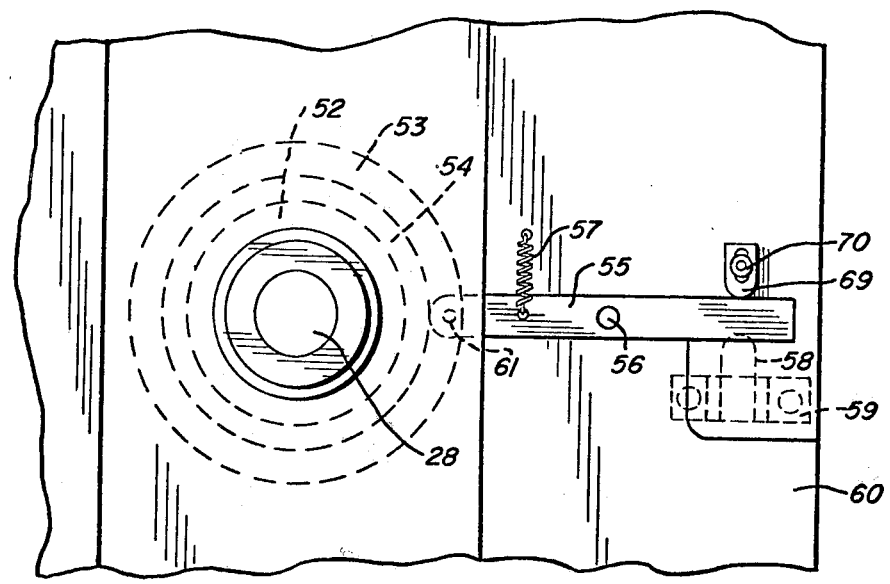
FIG. 10
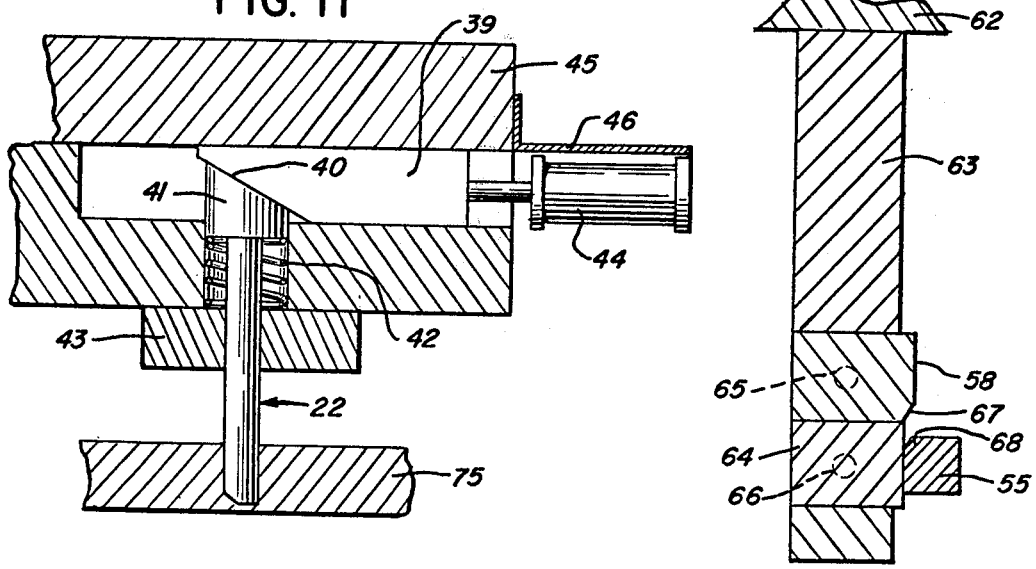
FIG. 11
FIG. 12 ns so as to provide the selective blanking out of the projection from the first sheet of the stack.

The projections are formed by the die structure to extend from the sheet preferably a distance no greater than the thickness of the sheet so that the projection extending into the blanked out aperture of the first sheet is effectively fully received therein.

In the illustrated embodiment, the control of the die structure is effected by suitable cam means which effectively varies the stroke thereby to provide the desired projection formation or blanked out operation.

The interlocked stacked assembly may be subjected to a press fit force prior to the delivery of the assembly from the blanking station to maintain the assembly during subsequent manufacturing operations.

The die structure of the present invention comprises an improved means for providing a low cost, efficient manufacture of a dynamoelectric structure as discussed above.

LAMINATED STACK MANUFACTURE

This is a division of application Ser. No. 819,479, filed July 27, 1977, now issued as U.S. Pat. No. 4,110,895.

BACKGROUND OF THE INVENTION

1. Field of the Invention

This invention relates to dynamoelectric manufacture and in particular to an apparatus for forming a laminated dynamoelectric structure.

2. Description of the Prior Art

In U.S. Pat. No. 3,202,851 of W. J. Zimmerle et al, a manufacture of a dynamoelectric machine is illustrated wherein interlocked laminations are provided for forming a stator assembly. The laminations are provided with formed projections to define the desired interlocking means between the respective laminations.

Additional prior art patents which show the state of the art in connection with apparatus and processes for forming such stacked laminated structures includes U.S. Pat. Nos. Phelps et al 1,817,462, Johnson 1,861,059, Zimmerle 3,210,824, Bausman et al 1,874,158, Heftler 2,283,629, Goran 2,368,295, Roters 2,483,024, Korski 2,763,916, Ebbert 2,933,204, Westphalen 2,971,106, Ploran 2,975,312, Hicks 2,996,791, Rediger 3,012,162, Hopp et al 3,060,992, Post 3,062,262, Boyer 3,070,058, Zimmerle 3,110,831, Zimmerle 3,203,077, and MacLaren 2,998,638. Additionally, Canadian Pat. No. 603,175 of Gordon W. Herzog, and German Pat. No. 917,626 teach interlocked laminated sheet structures for such structures.

SUMMARY OF THE INVENTION

While the above discussed patents show a wide range of different techniques and apparatuses for providing such laminated dynamoelectric structures, the present invention comprehends an improvement thereover wherein the stacked assembly is provided by new improved apparatus and die structure for facilitated and low cost construction.

More specifically, the present invention comprehends the provision in an apparatus for forming from a metal sheet a laminated dynamoelectric structure having a plurality of stacked interlocked formed sheets an improved die structure for use in a punching station wherein the die structure punches a portion of the sheet to form therein a displaced projection, the portion of the sheet from which the projection is displaced defining an aperture means for advancing the sheet to a blanking station. Means are provided at the blanking station for blanking out the portion to define a formed sheet. The punching station means, advancing means, and blanking station means being operated seriatim to cause a series of such sheet portions to be formed with the projections and apertures at the punching station and advanced sequentially to the blanking station whereat the formed sheets are blanked out and stacked, and control means for selectively causing the punching station means to continue the punching operation of the punch sufficiently to blank out the projection of the first of the series of the sheet portions from the first of the sheets of the stack. The apparatus may be arranged to provide an indexing of the respective sheets so as to provide a skewed axis dynamoelectric structure as desired.

In the illustrated embodiment, the control means comprises means for varying the stroke of the punch

BRIEF DESCRIPTION OF THE DRAWING

Other features and advantages of the invention will be apparent from the following description taken in connection with the accompanying drawing wherein:

FIG. 10 is a fragmentary plan view illustrating the indexing means of the apparatus;

FIG. 11 is a fragmentary vertical section illustrating the indexing means; and

FIG. 12 is a further vertical section illustrating the indexing means.

DESCRIPTION OF THE PREFERRED EMBODIMENT

Figure 1:
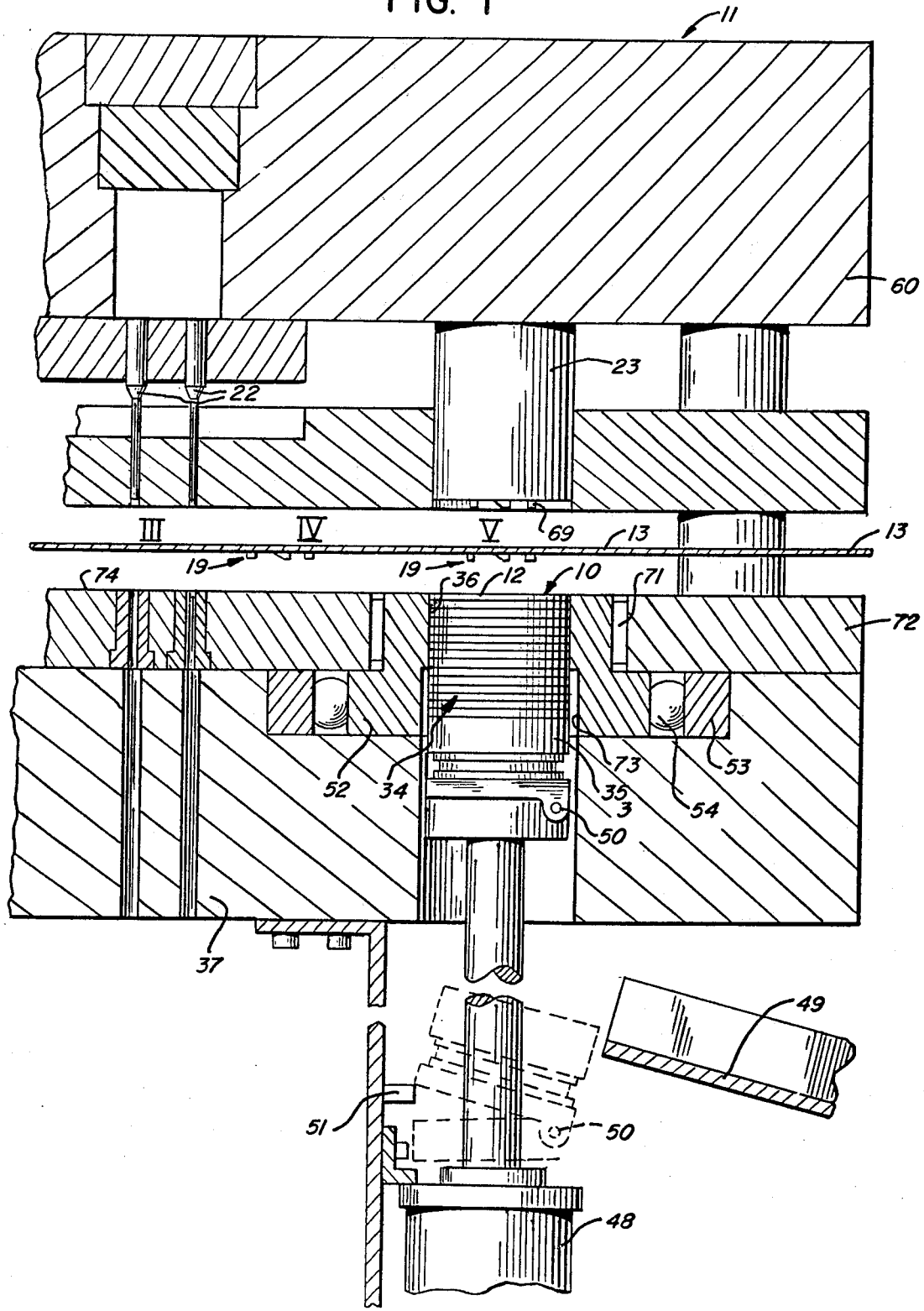
FIG. 1 is a fragmentary vertical section of an apparatus having an improved die structure embodying the invention.

In the exemplary embodiment of the invention as disclosed in the drawing, a laminated dynamoelectric structure generally designated 10, as shown in FIG. 1, may be formed to comprise the rotor of an electric motor, or the like. Structure 10 is formed in an improved apparatus generally designated 11 defining a plurality of forming stations. The structure 10 comprises a plurality of interlocking sheets 12 which may be formed from a sheet metal strip 13 by a series of successive forming operations as shown in FIG. 2, in the apparatus 11.

Figure 2:
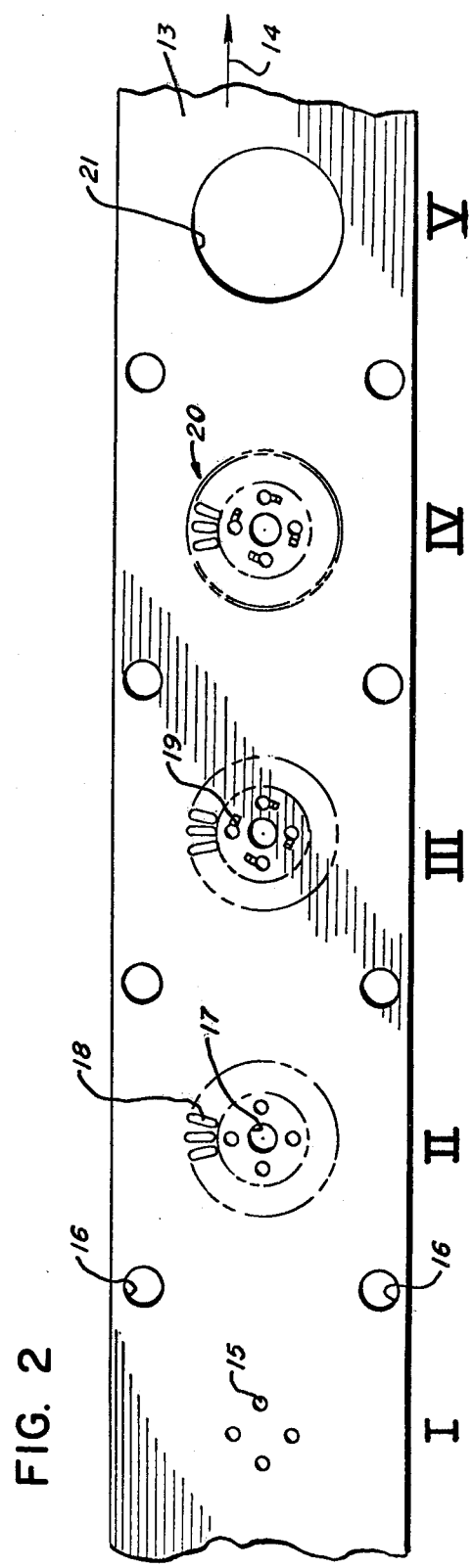
FIG. 2 is a top plan view of the formed sheet metal strip illustrating different steps in the forming of the dynamoelectric machine sheet therein.

More specifically as illustrated in FIG. 2, the sheet metal strip 13 may be sequentially advanced in the direction of the arrow 14 within apparatus 11 so as to perform a series of operations on spaced portions of the strip as it is advanced. Illustratively, at station I, a plurality of skew control holes 15 are provided in the strip concurrently with a pair of pilot holes 16. At station II in apparatus 11, a central shaft hole 17 and an annular array of rotor slots 18 are formed in the strip concentrically of the control holes 15.

At station III, sheet interlock means 19 are formed in the sheet. The thusly formed portion 20 of the sheet is moved through station IV to a blanking station V wherein the formed portion is blanked from the sheet leaving hole 21 therein.

The sheet may be further advanced beyond station V for forming a stator structure concentrically of the hole 21. However, the present invention is concerned with the forming of the portion 20 and the stacking thereof to define the structure 10.

Stations III, IV, and V are identified on FIG. 1 illustrating the arrangement of the apparatus 11 for providing the interlocking means 19. As shown in FIG. 1, station III includes a plurality of forming dies 22 for concurrently forming the interlocking means 19 therein. Station V includes a combination blanking, indexing and stacking die 23.

Figure 3:
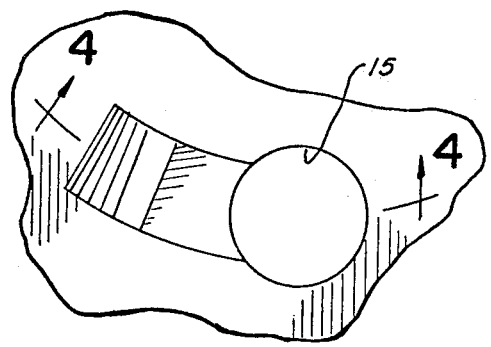
FIG. 3 is a fragmentary plan view of a portion of the strip defining the interlocking means of the sheet.
Figure 4:
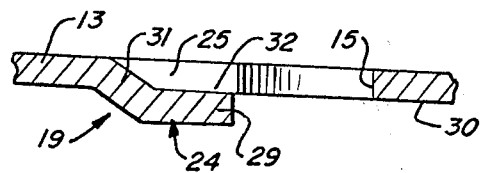
FIG. 4 is a fragmentary vertical section taken substantially along the line 4—4 of FIG. 3.

Referring now more specifically to FIGS. 3–9, the interlocking means 19 illustratively comprises a projection 24 formed from the sheet 13 by the die 22. The projection is offset from the sheet so as to define an aperture 25 opening to the hole 15, as shown in FIGS. 3 and 4.

The lower edge 26 of the forming die 22 is provided with a bevel surface 27 and a planar transverse surface 28 so as to cause the projection 24 to define an offset portion 29 spaced below the lower surface 30 of the sheet 13 and an angled connecting portion 31 connecting the offset portion 29 to the body of the sheet.

As shown in FIG. 4, offset portion 29 may be displaced downwardly the thickness of the sheet 13 so as to have its upper surface 32 substantially coplanar with the lower surface 30 of the sheet.

Figure 6:
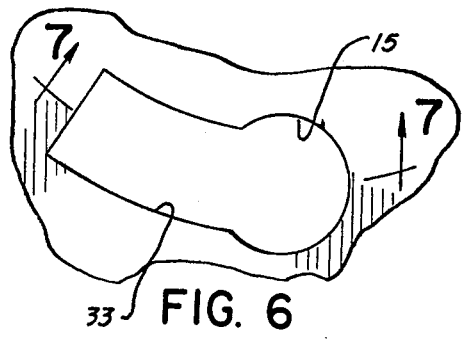
FIG. 6 is a fragmentary plan view of the portion of a sheet intended to comprise the first lamination of the stack.
Figure 7:
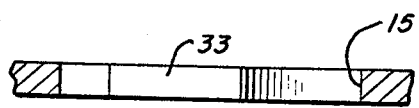
FIG. 7 is a fragmentary vertical section taken substantially along the line 7—7 of FIG. 6.
Figure 8:
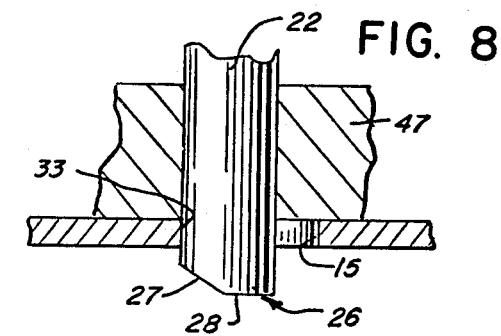
FIG. 8 is a fragmentary vertical section illustrating the operation of the punch means in forming the blanked out apertured portion of FIGS. 6 and 7.
Figure 5:
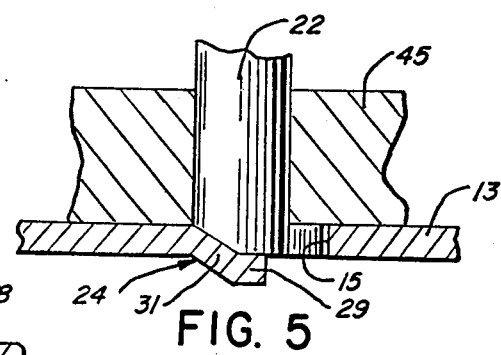
FIG. 5 is a vertical section illustrating the operation of the punch in forming the aperture and projection means of FIGS. 3 and 4.

As further illustrated in FIGS. 6–8, punch die 22 may be selectively caused to have a greater downward stroke than in forming the interlock projection 24 of FIGS. 3–5 whereby the projection 24 may be effectively blanked out so as to leave a through opening 33 free of any downwardly extending projection 24.

Figure 9:
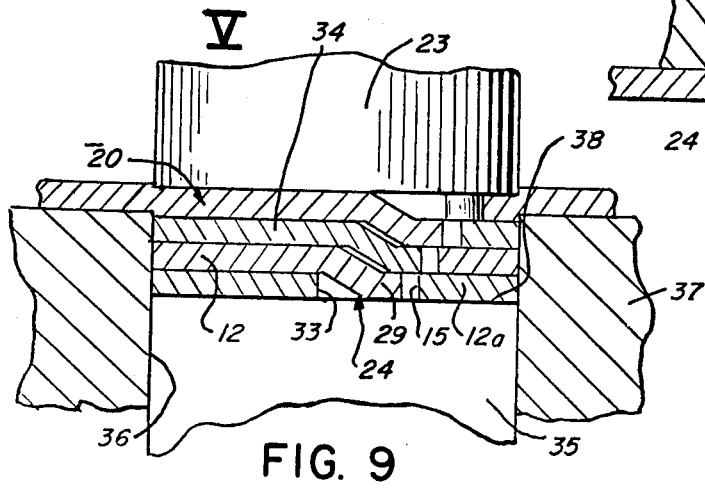
FIG. 9 is a fragmentary vertical section illustrating the step of blanking out the formed portion of the sheet to define the completed sheet and the placement of the blanked out sheet on the preceding stacked sheets.

Referring now to FIG. 9, the stacked assembly 34 may be carried on a support 35 received in an opening 36 in a base portion 37 of the apparatus 11 at station V. The blanking die 23 is arranged to blank out the formed portion 20 of the sheet so as to define the sheets 12. As the laminations are blanked out to form the hole 21, they are urged downwardly against the uppermost sheet carried by the support 35 into the hole 36 with the stacking of the sheets continuing until the completed stacked assembly 34 is provided.

As shown in FIG. 9, the lowermost, or first, of the sheets 12a on support 35 comprises a sheet defined by the blanked out opening 33 illustrated in FIGS. 6–8. Thus, as no projection 24 depends from the first sheet 12a, the sheet may rest on the flat upper surface 38 of support 35 with the projection 24 of the superjacent sheet extending downwardly into the opening 33 with the offset portion 29 thereof being effectively fully received within the opening 33 and hole 15, as shown in FIG. 9. As further shown in FIG. 9, each of the successively superjacent sheets has the downwardly extending projections 24 thereof received in the apertures 25 of the subjacent sheet so as to define interlocking means between the respective sheets of the stack.

The means for controlling the stroke of the punch 22 is illustrated in FIG. 11 to include a cam 39 engaging a cam surface 40 on an upper end portion 41 of the punch 22. Punch portion 41 is biased upwardly by a suitable spring 42 acting between the portion 41 and a spring retainer 43.

Movement of cam 39 is controlled by a solenoid 44 carried by the punch holder 45 on a suitable bracket 46. As will be obvious to those skilled in the art, the solenoid 44 may be selectively operated suitably to cause the punch 22 to move downwardly through the guide 47 to form the projection 24, as shown in FIG. 5, or further downwardly to blank out the projection and form the hole 33, as shown in FIG. 8. Thus the solenoid may be operated to provide the full movement of the punch 22 of FIG. 8 at preselected intervals so as to form the lowermost sheet 12a of the series when desired.

As further shown in FIG. 1, the support 35 may be carried on a suitable air cylinder 48 which allows the stacked assembly 34 to move downwardly through the hole 36 until the desired height of the stacked assembly is reached. At that time, the air cylinder may be operated to provide a high compressive force to the stacked assembly so as to provide a press fitted interlocking of the projections with the edges of the apertures of the subjacent sheets so as to provide a maintained-integrity assembly which may be delivered from the blanking station onto a suitable guide 49 for delivery from the apparatus 11, as desired. Thus, as shown in FIG. 1, when the air cylinder is retracted upon completion of the press fitting interlocking operation, the support 35 may be pivoted on a suitable pivot 50 by means of a pin 51 to permit the stacked assembly to move onto the guide for subsequent delivery.

As indicated briefly above, it is desired to provide an indexing of the respective sheets as they are interlocked in the stacked assembly 34. For this purpose, the base 37 defines a die including an inner ring 52, an outer ring 53, and an interposed one-way clutch 54.

As the blanking die 23 is brought downwardly to blank out the sheet from the sheet, a rotation of the blanked out lamination is concurrently effected to as to provide the desired skewing angle in the stacked assembly of sheets. For this purpose, an indexing lever 55 is mounted on a pivot 56 and biased by means of a spring 57 against a cam 58 adjustably mounted by suitable bracket 59 to the die holder 60. The end of the lever is connected to the outer ring 53 by a suitable pin 61. The punch holder 52 carries the camming frame 63 for guiding the cam 58 and a second cam 64 for controlling the movement of lever 55, as seen in FIG. 12. The position of cam 58 may be adjusted by means of a locking screw 65 and the position of cam 64 may be adjusted by means of a locking screw 66.

As shown in FIG. 12, cam 58 defines a bevel surface 67 cooperating with a complementary bevel surface 68 on the lever 55 to effect the desired indexing movement of the outer ring 53.

As further shown in FIG. 1, the punch 23 may be provided with projections 69 which are complementary to the formed apertures 25 so as to provide a snug fit therein during the blanking out operation when the blanking punch 23 is brought downwardly against the sheet 13 from the position of FIG. 1.

Thus, when the punch 23 brings the blanked out lamination from sheet 13 onto the top sheet of the stack, the die 52 is concurrently indexed to provide the desired skewed relationship of the successive sheets interlocked in the stacked assembly 34. In the illustrated embodiment, a stop 69 is provided on the die holder to limit the swinging of the lever 55. The stop may be adjustably secured to the die holder by a suitable bolt 70 to permit adjusting the lever to provide the desired skew angle.

To facilitate movement of the die 52, needle bearings 71 may be provided between the die portion 52 and the die holder 72, as shown in FIG. 1.

As further shown in FIG. 1, the inner die ring 52 may be undercut at 73 to facilitate the downward movement of the stacked sheets 34.

In the forming operation, the sheet 13, as shown in FIG. 1, is maintained in a floating disposition above the upper surface 74 of the die plate. A press stripper 75 is provided for urging the sheet 13 downwardly onto the die plate to permit the punching operation effected by punch 22, as discussed above, against the upper surface 74 of the die. As discussed above, preselected ones of the punching operations may be caused to effect the desired blanking operation of FIGS. 6–8 under the control of cam 39 and solenoid 44 through suitable control of the solenoid. Thus, the present invention comprehends an improved die structure for use in a simplified apparatus for controlling the arrangement of the interlock means of the respective sheets of the stacked assembly by suitably controlling the movement of the die structure. The invention further comprehends the improved facilitated forming of the stacked assembly by means of the cutoff punch 23 which blanks out the sheet from the formed portion 20 of the sheet 13 and provides an indexed, stacked association of the sheets with the first lamination 12a being defined by the through opening 33 so as to permit the support thereof directly on the upper surface 38 of the support 35.

The foregoing disclosure of specific embodiments is illustrative of the broad inventive concepts comprehended by the invention.

I claim:

1. A laminated stack manufacture comprising:
   a first sheet having a first keyhole-shaped aperture;
   a second sheet overlying said first sheet and having a second keyhole-shaped aperture substantially corresponding to and aligned with said first aperture, projection extending downwardly from said second sheet and received in said first aperture, said projection defining an arcuate distal end defining with an arcuate end of the subsequent aperture a circular opening in each but the top sheet; and
   a plurality of additional sheets similar to said second sheet and stacked thereon with the projection of each extending into the aperture of the subjacent sheet and the top surface of the top sheet being substantially planar, the bottom surface of said first sheet being substantially planar and having said first aperture open downwardly therethrough, the said sheets cooperatively defining an interlocked stack having apertured substantially planar top and bottom surfaces, said planar bottom surface of the stack permitting positive facial support of the stack on a flat underlying support during stacking manufacture thereof.

2. The laminated stack manufacture of claim 1 wherein each sheet projection includes a distal offset portion subjacent the aperture thereof and extending parallel to the flatwise extent of the sheet.

3. The laminated stack manufacture of claim 1 wherein each sheet projection includes a distal offset portion subjacent the aperture thereof and extending parallel to the flatwise extent of the sheet and a connecting portion angled from the sheet to said distal offset portion.

4. The laminated stack manufacture of claim 1 wherein each sheet projection includes a distal offset portion subjacent the aperture thereof and extending parallel to the flatwise extent of the sheet, the top surface of said distal offset portion being substantially coplanar with the bottom surface of the sheet from which it projects.

5. The laminated stack manufacture of claim 1 wherein each sheet projection includes a distal offset portion subjacent the aperture thereof and extending parallel to the flatwise extent of the sheet, the top surface of said distal offset portion being substantially coplanar with the bottom surface of the sheet from which it projects and the bottom surface of said distal offset portion being substantially coplanar with the bottom surface of the subjacent sheet into which the projection extends.

6. The laminated stack manufacture of claim 1 wherein each projection defines arcuate side edges.

7. The laminated stack manufacture of claim 1 wherein the tip of the distal offset portion defines an arcuate end edge.

8. The laminated stack manufacture of claim 1 wherein each said aperture includes a circular end portion.

9. The laminated stack manufacture of claim 1 wherein each said aperture includes a circular end portion and an arcuate portion opening into said circular end portion.

10. The laminated stack manufacture of claim 1 wherein each said aperture includes a circular end portion and an arcuate portion opening into said circular end portion, the end of said arcuate portion opposite the circular end portion being substantially rectilinear.

* * * * *